United States Patent
Nakano

(10) Patent No.: US 10,663,426 B2
(45) Date of Patent: May 26, 2020

(54) SENSOR CONTROLLER, INTERNAL COMBUSTION ENGINE CONTROL SYSTEM, AND INTERNAL COMBUSTION ENGINE CONTROLLER

(71) Applicant: NGK Spark Plug Co., LTD., Nagoya (JP)

(72) Inventor: Yoshihiro Nakano, Komaki (JP)

(73) Assignee: NGK Spark Plug Co., LTD., Nagoya (JP)

( * ) Notice: Subject to any disclaimer, the term of this patent is extended or adjusted under 35 U.S.C. 154(b) by 87 days.

(21) Appl. No.: 15/800,963

(22) Filed: Nov. 1, 2017

(65) Prior Publication Data

US 2018/0128775 A1 May 10, 2018

(30) Foreign Application Priority Data

Nov. 7, 2016 (JP) .................. 2016-217534

(51) Int. Cl.
*F01N 3/20* (2006.01)
*F01N 9/00* (2006.01)
*F01N 3/00* (2006.01)
*G01N 27/40* (2006.01)
*G01N 27/419* (2006.01)
*F01N 13/00* (2010.01)
*G01N 27/407* (2006.01)
*B01D 53/94* (2006.01)

(52) U.S. Cl.
CPC .......... *G01N 27/419* (2013.01); *F01N 3/206* (2013.01); *F01N 3/208* (2013.01); *F01N 9/00* (2013.01); *F01N 13/008* (2013.01); *G01N 27/4074* (2013.01); *B01D 53/9495* (2013.01); *F01N 2560/021* (2013.01); *F01N 2900/0416* (2013.01); *Y02T 10/47* (2013.01)

(58) Field of Classification Search
CPC .......... F01N 3/008; F01N 3/206; F01N 3/208; F01N 3/2066; F01N 9/00; F01N 2560/021; F01N 2900/0416; G01N 27/4074; G01N 27/419; B01D 53/9495; Y02T 10/47
USPC ................... 60/274, 277, 286, 295, 299–301
See application file for complete search history.

(56) References Cited

U.S. PATENT DOCUMENTS

| 2011/0048970 A1* | 3/2011 | Sugaya | G01N 27/419 205/781 |
|---|---|---|---|
| 2012/0145543 A1* | 6/2012 | Sugaya | G01N 27/4074 204/424 |
| 2016/0082390 A1 | 3/2016 | Nakano et al. | |

FOREIGN PATENT DOCUMENTS

JP 2016-065862 A 4/2016

* cited by examiner

*Primary Examiner* — Thai Ba Trieu
*Assistant Examiner* — Dapinder Singh
(74) *Attorney, Agent, or Firm* — Leason Ellis LLP

(57) ABSTRACT

A sensor controller includes a signal reception determination section and a use suspension section. The signal reception determination section determines whether or not the sensor controller has received a specific state signal that indicates a specific state in which exhaust gas may contain a specific gas that differs from ammonia and reacts with an ammonia sensor. When the signal reception determination section determines that the sensor controller has received the specific state signal, the use suspension section suspends at least temporarily use of a detection result detected by the ammonia sensor after the determination. Specifically, upon reception of the specific state signal, the sensor controller suspends at least temporarily the use of the detection result detected by the ammonia sensor after the reception of the specific state signal.

11 Claims, 6 Drawing Sheets

SENSOR CONTROLLER, INTERNAL COMBUSTION ENGINE CONTROL SYSTEM, AND INTERNAL COMBUSTION ENGINE CONTROLLER

This application claims the benefit of Japanese Patent Application No. 2016-217534, filed Nov. 7, 2016, which is incorporated herein by reference in its entirety.

FIELD OF THE INVENTION

The present disclosure relates to a sensor controller, to an internal combustion engine control system, and to an internal combustion engine controller.

BACKGROUND OF THE INVENTION

Detecting ammonia in measurement gas (such as exhaust gas from an internal combustion engine) using an ammonia sensor is a known art.

An ammonia detection signal that varies according to the result of detection by the ammonia sensor is outputted from, for example, a sensor controller that controls the ammonia sensor. The ammonia detection signal is used, for example, by an internal combustion engine controller to control the internal combustion engine. The internal combustion engine control system is configured to include the internal combustion engine controller, the ammonia sensor, and the sensor controller.

Some ammonia sensors react not only to ammonia but also to another specific gas (such as a flammable gas). An ammonia detection signal obtained using such an ammonia sensor varies not only due to the influence of ammonia but also due to the influence of the specific gas, and therefore the accuracy of detection of ammonia may decrease.

A technique proposed to address this issue is to detect the concentration of oxygen in the exhaust gas and then correct, on the basis of the oxygen concentration detected, the result of detection of ammonia that is obtained through the ammonia detection signal (Japanese Patent Application Laid-Open (kokai) No. 2016-065862). With this technique, the reduction in the accuracy of detection of ammonia due to the influence of the specific gas can be suppressed.

Problems to be Solved by the Invention

However, with the above technique, when the ammonia detection signal varies due to the influence of the specific gas under circumstances where the oxygen concentration does not change largely, the result of the detection of ammonia may not be appropriately corrected. In this case, it may not be possible to suppress the reduction in the accuracy of detection of ammonia.

It is an object of the present disclosure to provide a sensor controller, an internal combustion engine control system, and an internal combustion engine controller which detect ammonia in exhaust gas from an internal combustion engine through use of an ammonia sensor and which can suppress a reduction in the accuracy of detection of ammonia due to the influence of a specific gas.

SUMMARY OF THE INVENTION

Means for Solving the Problems

One aspect of the present disclosure provides a sensor controller that controls an ammonia sensor for detecting ammonia in exhaust gas from an internal combustion engine and outputs at least one of a detection result from the ammonia sensor and an ammonia detection signal corresponding to the detection result to an external device. The sensor controller comprises a signal reception determination section and a use suspension section.

The signal reception determination section determines whether or not the sensor controller has received a specific state signal that indicates a specific state in which the exhaust gas may contain a specific gas that differs from ammonia and reacts with the ammonia sensor. When the signal reception determination section determines that the sensor controller has received the specific state signal, the use suspension section suspends at least temporarily use of the detection result detected by the ammonia sensor after the determination.

Namely, when this sensor controller receives the specific state signal, this sensor controller suspends at least temporarily the use of the detection result detected by the ammonia sensor after the reception of the specific state signal. This can prevent ammonia from being detected on the basis of the detection result changed due to the influence of the specific gas.

With this sensor controller, false detection of ammonia due to the influence of the specific gas can be prevented, and a reduction in the accuracy of detection of ammonia can be prevented.

The "detection result from the ammonia sensor" whose use is to be suspended may be, for example, the electromotive force (detection result) generated in the ammonia sensor according to the concentration of ammonia or may be information (e.g., an ammonia signal) that varies according to the detection result. The ammonia detection signal is not limited to the analog signal outputted from the ammonia sensor but is a concept including any signal that varies according to the detection result from the ammonia sensor. Examples of the ammonia detection signal include an amplified analog signal obtained by amplifying the analog signal, a signal in a specific frequency range that is obtained by subjecting the analog signal to filtering processing based on frequency characteristics, and a digital signal obtained by subjecting the analog signal to A/D conversion.

In the sensor controller of the present disclosure, the use suspension section may be configured to initiate the suspension of the use of the detection result at a suspension initiation time later than a time at which the signal reception determination section determines that the sensor controller has received the specific state signal.

Specifically, some internal combustion engines have a structure in which a time delay occurs between the time the reception of the specific state signal is started and the time the specific gas actually reaches the ammonia sensor and causes the detection result to vary. In this case, when the use suspension section initiates the suspension of the use of the detection result not at the reception determination time but at the suspension initiation time, the start time of the period of suspension of use of the detection result can be set to an appropriate time.

In this manner, the detection result not influenced by the specific gas can be used until the time at which the detection result is changed due to the influence of the specific gas, and this can extend the period of time during which ammonia can be detected.

In the sensor controller of the present disclosure, the use suspension section may be configured to terminate the suspension of the use of the detection result after lapse of a prescribed use suspension period from the initiation of the suspension of the use of the detection result.

In this sensor controller, the initiation time of the suspension of the use of the detection result is determined on the basis of the specific state signal. Then the use of the detection result can be suspended over the use suspension period by measuring the elapsed time without detecting the specific state signal.

In the sensor controller of the present disclosure, the specific state signal may be a rich spike signal that indicates a rich spike control state in which fuel is temporarily injected into an exhaust pipe of the internal combustion engine.

In the rich spike control state, the exhaust gas may contain a flammable gas, and the flammable gas is reactive with the ammonia sensor. Therefore, the rich spike signal is an example of a specific state signal indicating the specific state in which the exhaust gas may contain the specific gas reactive with the ammonia sensor.

In the sensor controller of the present disclosure, the ammonia sensor may be a first detection section provided in the sensor controller. In this case, the ammonia sensor is configured to output, as the detection result, a first concentration signal that varies according to both the concentration of the ammonia contained in the exhaust gas and the concentration of the flammable gas contained in the exhaust gas. The sensor controller may further comprise a second detection section and a flammable gas determination section.

The second detection section is configured to output a second concentration signal that varies according to one of the concentration of the ammonia contained in the exhaust gas and the concentration of the flammable gas contained in the exhaust gas.

The flammable gas determination section is configured to determine, on the basis of the first concentration signal output from the first detection section and the second concentration signal output from the second detection section, whether or not the exhaust gas contains the flammable gas.

When the signal reception determination section determines that the sensor controller has received the specific state signal and the flammable gas determination section determines that the exhaust gas contains the flammable gas, the use suspension section suspends at least temporarily the use of the detection result outputted after the determination by the signal reception determination section and the determination by the flammable gas determination section.

In this sensor controller, the second detection section may output the second concentration signal that varies according to the concentration of ammonia. In this case, when the output value of the second concentration signal is smaller than the output value of the first concentration signal, the exhaust gas can be determined to contain the flammable gas. This is because, although the first detection section outputs the signal whose value varies according to the concentration of the flammable gas, the second detection section does not output the signal whose value varies according to the concentration of the flammable gas.

In this sensor controller, the second detection section may output the second concentration signal that varies according to the concentration of the flammable gas. In this case, when the output value of the second concentration signal is larger, the exhaust gas can be determined to contain the flammable gas. This is because the second detection section outputs the signal whose value varies according to the concentration of the flammable gas.

As described above, this sensor controller can determine whether or not the exhaust gas contains the flammable gas. When a rich spike occurs, the flammable gas is contained in the exhaust gas. Therefore, the sensor controller can detect the rich spike even when the concentration of oxygen contained in the exhaust gas does not decrease steeply, so that the accuracy of rich spike detection can be improved.

When the signal reception determination section determines that the sensor controller has received the specific state signal and the flammable gas determination section determines that the exhaust gas contains the flammable gas, the sensor controller suspends at least temporality the use of the detection result outputted after the determination by the signal reception determination section and the determination by the flammable gas determination section.

Therefore, in this sensor controller, the first detection section outputs the first concentration signal whose value varies according to both the concentration of ammonia and the concentration of the flammable gas. Even in this case, a reduction in the accuracy of computation of the ammonia concentration when a rich spike occurs can be prevented.

The first and second concentration signals used for the determination by the flammable gas determination section are not limited to the signals themselves and may be, for example, values that indirectly indicate the signals, such as first and second computed concentrations computed on the basis of the signals.

The above sensor controller including the first detection section, the second detection section, and the flammable gas determination section may further include a first computation unit and a second computation unit.

The first computation unit is configured to compute the concentration of ammonia contained in the exhaust gas as a first computed concentration on the basis of the first concentration signal output from the first detection section. The second computation unit is configured to compute the concentration of the specific gas as a second computed concentration on the basis of the second concentration signal output from the second detection section.

The flammable gas determination section may be configured to determine whether or not the exhaust gas contains the flammable gas on the basis of the first computed concentration computed by the first computation unit and the second computed concentration computed by the second computation unit instead of the first and second concentration signals.

Also in this sensor controller, a reduction in the accuracy of computation of the ammonia concentration when a rich spike occurs can be prevented even when the value of the first concentration signal output from the first detection section varies according to both the concentration of ammonia and the concentration of the flammable gas.

Another aspect of the present disclosure provides an internal combustion engine control system which comprises an internal combustion engine controller that controls operating conditions of an internal combustion engine; an ammonia sensor that detects ammonia in exhaust gas from the internal combustion engine; and the sensor controller described above.

This internal combustion engine control system includes the above-described sensor controller. Therefore, false detection of ammonia due to the influence of the specific gas can be prevented, and a reduction in the accuracy of detection of ammonia can be prevented.

Another aspect of the present disclosure provides an internal combustion engine controller that controls operating conditions of an internal combustion engine. The internal combustion engine controller comprises an ammonia detection signal reception section, a state determination section, and a use suspension section.

The ammonia detection signal reception section is configured to receive at least one of a detection result from an ammonia sensor that detects ammonia in exhaust gas from the internal combustion engine and an ammonia detection signal corresponding to the detection result. The state determination section is configured to determine whether or not the internal combustion engine is in a specific state in which the exhaust gas may contain a specific gas that differs from ammonia and reacts with the ammonia sensor. The use suspension section is configured such that, when the state determination section determines that the internal combustion engine is in the specific state, the use suspension section suspends use of the at least one of the detection result and the ammonia detection signal that are received after the determination by the state determination section is suspended.

Namely, when this internal combustion engine controller determines that the internal combustion engine is in the specific state, this internal combustion engine controller suspends the use of the at least one of the detection result and the ammonia detection signal that are received after the determination. This can prevent ammonia from being detected on the basis of the detection result changed due to the influence of the specific gas.

With this internal combustion engine controller, false detection of ammonia due to the influence of the specific gas can be prevented, and a reduction in the accuracy of detection of ammonia can be prevented.

As in the case of the above-described sensor controller, the "detection result from the ammonia sensor" whose use is to be suspended may be, for example, the electromotive force (detection result) generated in the ammonia sensor according to the concentration of ammonia or may be information (e.g., an ammonia signal) that varies according to the detection result. The ammonia detection signal is not limited to the analog signal outputted from the ammonia sensor but is a concept including any signal that varies according to the detection result from the ammonia sensor.

In the internal combustion engine controller of the present disclosure, the use suspension section may be configured to initiate the suspension of the use of the at least one of the detection result and the ammonia detection signal at a suspension initiation time later than a time at which the state determination section determines that the internal combustion engine is in the specific state.

Some internal combustion engines have a structure in which a time delay occurs between the time the internal combustion engine is determined to be in the specific state and the time the specific gas actually reaches the ammonia sensor and the detection result and the ammonia detection signal vary. In this case, when the use suspension section initiates the suspension of the use of the detection result and the ammonia detection signal not at the state determination time but at the suspension initiation time, the start time of the period of suspension of use of the detection result and the ammonia detection signal can be set to an appropriate time.

In this manner, the detection result and the ammonia detection signal that are not influenced by the specific gas can be used for ammonia detection until the time at which the detection result and the ammonia detection signal change due to the influence of the specific gas, and this can extend the period of time during which ammonia can be detected.

In the internal combustion engine controller of the present disclosure, the use suspension section may be configured to terminate the suspension of the use of the at least one of the detection result and the ammonia detection signal after lapse of a prescribed use suspension period from the initiation of the suspension of the use of the at least one of the detection result and the ammonia detection signal.

In this internal combustion engine controller, the initiation time of the suspension of the use of the detection result and the ammonia detection signal is determined on the basis of the determination result by the state determination section. Then the use of the detection result and the ammonia detection signal can be suspended over the use suspension period by measuring the elapsed time without the determination by the state determination section.

In the internal combustion engine controller of the present disclosure, the specific state may be a rich spike control state in which fuel is temporarily injected into an exhaust pipe of the internal combustion engine.

Specifically, in the rich spike control state, the exhaust gas may contain a flammable gas, and the flammable gas is reactive with the ammonia sensor. Therefore, the rich spike control state is an example of the specific state in which the exhaust gas may contain the specific gas reactive with the ammonia sensor.

In the internal combustion engine controller of the present disclosure, the ammonia sensor may be a first detection section provided in the internal combustion engine controller. The ammonia sensor may be configured to output, as the detection result, a first concentration signal that varies according to both the concentration of the ammonia contained in the exhaust gas and the concentration of a flammable gas contained in the exhaust gas. The internal combustion engine controller may further comprise a second detection section and a flammable gas determination section.

The second detection section is configured to output a second concentration signal that varies according to one of the concentration of the ammonia contained in the exhaust gas and the concentration of the flammable gas contained in the exhaust gas.

The flammable gas determination section is configured to determine, on the basis of the first concentration signal output from the first detection section and the second concentration signal output from the second detection section, whether or not the exhaust gas contains the flammable gas.

When the state determination section determines that the internal combustion engine is in the specific state and the flammable gas determination section determines that the exhaust gas contains the flammable gas, the use suspension section suspends use of the at least one of the detection result and the ammonia detection signal that are detected after the determination by the state determination section and the determination by the flammable gas determination section.

In this internal combustion engine controller, the second detection section may output the second concentration signal that varies according to the concentration of ammonia. In this case, when the output value of the second concentration signal is smaller than the output value of the first concentration signal, the exhaust gas can be determined to contain the flammable gas. This is because, although the first detection section outputs the signal whose value varies according to the concentration of the flammable gas, the second detection section does not output the signal whose value varies according to the concentration of the flammable gas.

In this internal combustion engine controller, the second detection section may output the second concentration signal that varies according to the concentration of the flammable gas. In this case, when the output value of the second concentration signal is larger, the exhaust gas can be determined to contain the flammable gas. This is because the second detection section outputs the signal whose value varies according to the concentration of the flammable gas.

As described above, the internal combustion engine controller can determine whether or not the exhaust gas contains the flammable gas. When a rich spike occurs, the flammable gas is contained in the exhaust gas. Therefore, the internal combustion engine controller can detect the rich spike even when the concentration of oxygen contained in the exhaust gas does not decrease steeply, so that the accuracy of rich spike detection can be improved.

When the state determination section determines that the internal combustion engine is in the specific state and the flammable gas determination section determines that the exhaust gas contains the flammable gas, the internal combustion engine controller suspends the use of the at least one of the detection result and the ammonia detection signal that are detected after the determination by the state determination section and the determination by the flammable gas determination section.

In this internal combustion engine controller, the first detection section outputs the first concentration signal whose value varies according to both the concentration of ammonia and the concentration of the flammable gas. Even in this case, a reduction in the accuracy of computation of the ammonia concentration when a rich spike occurs can be prevented.

The first and second concentration signals used for the determination by the flammable gas determination section are not limited to the signals themselves and may be, for example, values that indirectly indicate the signals, such as first and second computed concentrations computed on the basis of the signals.

The above internal combustion engine controller including the first detection section, the second detection section, and the flammable gas determination section may further include a first computation unit and a second computation unit.

The first computation unit is configured to compute the concentration of ammonia contained in the exhaust gas as a first computed concentration on the basis of the first concentration signal output from the first detection section. The second computation unit is configured to compute the concentration of the specific gas as a second computed concentration on the basis of the second concentration signal output from the second detection section.

The flammable gas determination section may be configured to determine whether or not the exhaust gas contains the flammable gas on the basis of the first computed concentration computed by the first computation unit and the second computed concentration computed by the second computation unit instead of the first and second concentration signals.

Also in this internal combustion engine controller, a reduction in the accuracy of computation of the ammonia concentration when a rich spike occurs can be prevented even when the value of the first concentration signal output from the first detection section varies according to both the concentration of ammonia and the concentration of the flammable gas.

In the sensor controller, the internal combustion engine control system, and the internal combustion engine controller in the present disclosure, the "suspension" means holding or masking the last detection result, the last concentration output value, or the last computed concentration, or setting the last detection result, the last concentration output value, or the last computed concentration to a prescribed value; suspending the computation of the concentration output value and computed concentration using the detection result; suspending the output of the signals representing the detection result, the concentration output value, and computed concentration; suspending the reception of the signals representing the detection result, the concentration output value, and the computed concentration; and outputting a signal indicating a use suspension state.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Embodiments to which the present invention is applied will be described with reference to the drawings.

However, the present invention is not limited to the following embodiments, and it will be appreciated that the present invention can be implemented in various forms so long as they fall within the technical scope of the invention.

1. First Embodiment

[1-1. Overall Structure]

An internal combustion engine control system 300 provided for an internal combustion engine (such as a diesel engine) of, for example, an automobile to control the operating conditions of the internal combustion engine will be described as a first embodiment. The internal combustion engine control system 300 includes a multi-gas sensor 2 shown in FIG. 1. The multi-gas sensor 2 detects NOx and ammonia.

Figure 2:
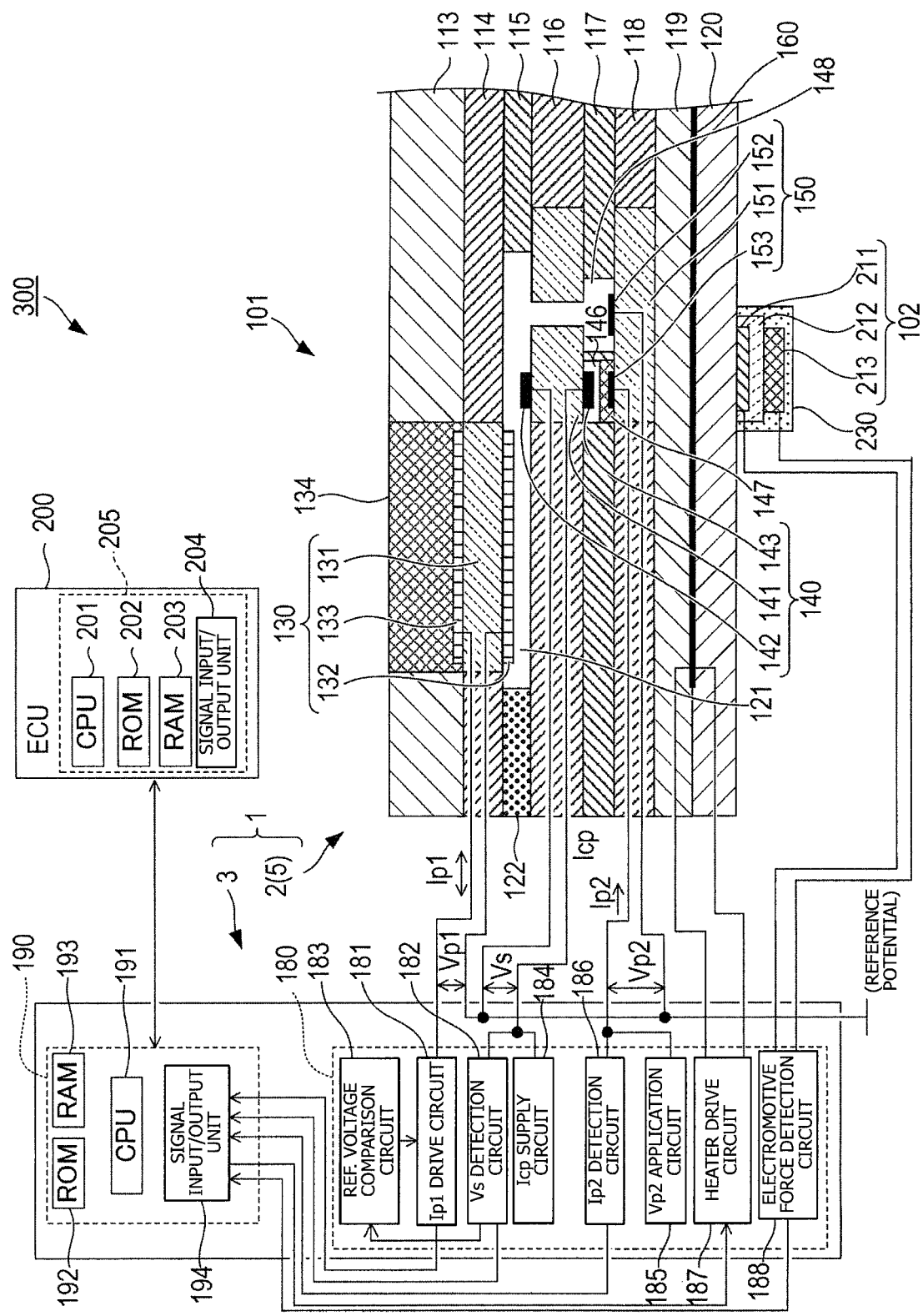
FIG. 2 is an illustration showing a schematic structure of an internal combustion engine control system including an internal combustion engine controller and a gas detection apparatus (a sensor control unit and a multi-gas sensor).

As shown in FIG. 2, the internal combustion engine control system 300 includes a gas detection apparatus 1 and an internal combustion engine controller 200 (hereinafter may be referred to as an ECU 200).

The gas detection apparatus 1 is used for, for example, a vehicle-mounted system including an NOx storage reduction catalyst for cleaning nitrogen oxide (NOx) contained in exhaust gas emitted from an internal combustion engine. The NOx storage reduction catalyst has the following feature. When the air-fuel ratio in the exhaust gas is lean, the NOx storage reduction catalyst stores nitrogen oxide. When the air-fuel ratio is rich, the NOx storage reduction catalyst reduces the stored nitrogen oxide and releases the reduced nitrogen. More specifically, the gas detection apparatus 1 detects the concentrations of ammonia, nitrogen dioxide, and nitrogen oxide contained in the exhaust gas on the downstream side of the NOx storage reduction catalyst. The vehicle on which the gas detection apparatus is mounted is referred to as the "present vehicle." Ammonia, nitrogen dioxide, and nitrogen oxide are denoted as $NH_3$, $NO_2$, and NOx, respectively.

A vehicle on which the gas detection apparatus 1 is to be mounted is not limited to a vehicle including the NOx storage reduction catalyst. The gas detection apparatus 1 may be mounted on a vehicle including a diesel oxidation catalyst (DOC) or a vehicle including a diesel particulate filter (DPF).

Figure 1:
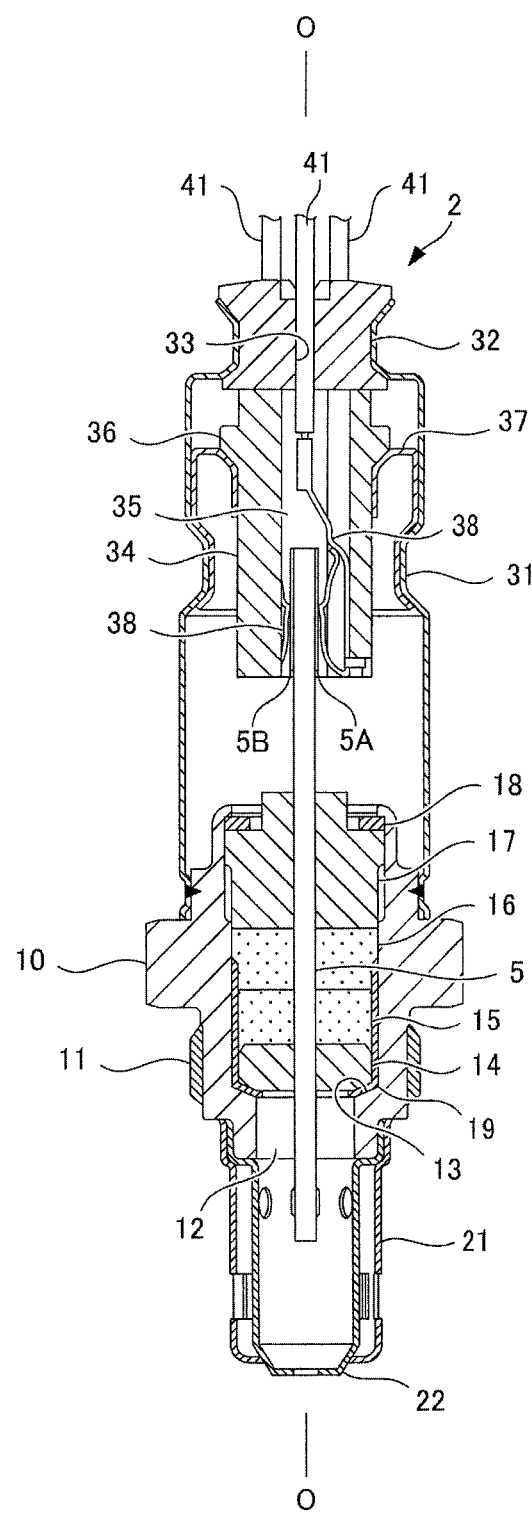
FIG. 1 is a cross-sectional view showing the internal structure of a multi-gas sensor.

The gas detection apparatus 1 includes the multi-gas sensor 2 shown in FIG. 1 and a sensor control unit 3 shown in FIG. 2.

[1-2. Multi-Gas Sensor]

As shown in FIG. 1, the multi-gas sensor 2 includes a sensor element unit 5, a metallic shell 10, a separator 34, and connection terminals 38. In the following description, the side of the multi-gas sensor 2 on which the sensor element unit 5 is disposed (i.e., the lower side in FIG. 1) is referred to as a forward end side, and the side on which the connection terminals 38 are disposed (i.e., the upper side in FIG. 1) is referred to as a rear end side.

The sensor element unit 5 has a plate shape extending in the direction of an axial line O. Electrode terminal portions 5A and 5B are disposed at the rear end of the sensor element unit 5. In FIG. 1, only the electrode terminal portions 5A and 5B are shown as electrode terminal portions formed in the sensor element unit 5 for the purpose of simplifying the drawing. However, in actuality, a plurality of electrode terminal portions are formed according to the number of, for example, electrodes included in an NOx detection section 101, a first ammonia detection section 102, and a second ammonia detection section 103 described later.

The metallic shell 10 is a tubular member, and a threaded portion 11 used to fix the multi-gas sensor 2 to an exhaust pipe of an internal combustion engine is formed on the external surface of the metallic shell 10. The metallic shell 10 has a through hole 12 extending in the direction of the axial line O and a ledge 13 protruding inward in the radial direction of the through hole 12. The ledge 13 is formed as an inward tapered surface extending from the radially outer side of the through hole 12 toward its center and inclined toward the forward end side.

The metallic shell 10 holds the sensor element unit 5 such that a forward end portion of the sensor element unit 5 protrudes forward from the through hole 12 and a rear end portion of the sensor element unit 5 protrudes rearward from the through hole 12.

A ceramic holder 14 that is a tubular member surrounding the radial circumference of the sensor element unit 5, talc rings 15 and 16 that are layers of charged talc powder, and a ceramic sleeve 17 are stacked in this order inside the through hole 12 of the metallic shell 10 from the forward end side toward the rear end side.

A crimp packing 18 is disposed between the ceramic sleeve 17 and a rear end portion of the metallic shell 10. A metallic holder 19 is disposed between the ceramic holder 14 and the ledge 13 of the metallic shell 10. The talc ring 15 and the ceramic holder 14 are contained inside the metallic holder 19, and as a result of compressive charging of the material of the talc ring 15, the metallic holder 19 and the talc ring 15 are hermetically integrated together. A rear end portion of the metallic shell 10 is crimped so as to press the ceramic sleeve 17 toward the forward end side through the crimp packing 18. Since the material of the talc ring 16 is compressively charged into the metallic shell 10, the hermetic seal between the inner circumferential surface of the metallic shell 10 and the outer circumferential surface of the sensor element unit 5 is ensured.

An outer protector 21 with gas introduction holes and an inner protector 22 with gas introduction holes are disposed at a forward end portion of the metallic shell 10. The outer protector 21 and the inner protector 22 are each a tubular member formed from a metallic material such as stainless steel and having a closed forward end. The inner protector 22 covers a forward end portion of the sensor element unit 5 and is welded to the metallic shell 10, and the outer protector 21 covers the inner protector 22 and is welded to the metallic shell 10.

A forward end portion of an outer tube 31 formed into a tubular shape is welded to a rear outer circumference of the metallic shell 10. A grommet 32 is disposed in a rear end opening of the outer tube 31 so as to close the opening.

Lead wire insertion holes 33 into which lead wires 41 are inserted are formed in the grommet 32. The lead wires 41 are electrically connected to the electrode terminal portions 5A and 5B of the sensor element unit 5.

The separator 34 is a tubular member disposed rearward of the sensor element unit 5. A space formed inside the separator 34 is an insertion hole 35 passing through the separator 34 in the direction of the axial line O. A flange portion 36 protruding radially outward is formed on the outer surface of the separator 34.

A rear end portion of the sensor element unit 5 is inserted into the insertion hole 35 of the separator 34, and the electrode terminal portions 5A and 5B are disposed inside the separator 34.

A tubular metallic holding member 37 is disposed between the separator 34 and the outer tube 31. The holding member 37 is in contact with the flange portion 36 of the separator 34 and also with the inner surface of the outer tube 31 and thereby holds the separator 34 such that the separator 34 is fixed to the outer tube 31.

The connection terminals 38 are members disposed inside the insertion hole 35 of the separator 34 and are electrically conductive members that electrically connect the electrode terminal portions 5A and 5B of the sensor element unit 5 to their respective lead wires 41. In FIG. 1, only two connection terminals 38 are shown for the purpose of simplifying the drawing.

[1-3. Internal Combustion Engine Controller]

As shown in FIG. 2, the sensor control unit 3 of the gas detection apparatus 1 is electrically connected to an internal combustion engine controller 200 mounted on the present vehicle. The internal combustion engine controller 200 receives data representing the concentration of $NO_2$, the concentration of NOx, and the concentration of ammonia (hereinafter referred to as the concentration of $NH_3$) in exhaust gas that are computed by the sensor control unit 3. Then the internal combustion engine controller 200 performs processing for controlling the operating conditions of the internal combustion engine on the basis of the data received and also performs cleaning processing for NOx accumulated in the catalyst (hereinafter may be referred to as NOx cleaning processing).

The internal combustion engine controller 200 includes a microcomputer 205. The microcomputer 205 includes a CPU 201, a ROM 202, a RAM 203, and a signal input/output unit 204. The CPU 201 executes programs stored in a non-transitory tangible recording medium to implement various functions of the internal combustion engine controller 200. In the present example, the ROM 202 corresponds to the non-transitory tangible recording medium in which the programs are stored. When one of the programs is executed, a method corresponding to the program is executed. The signal input/output unit 204 sends and receives various signals to and from the sensor control unit 3. The numbers of CPUs 201, ROMs 202, RAMs 203, and signal input/output units 204 included in the microcomputer 205 may be 1 or may be two or more. Part or all of the functions executed by the microcomputer 205 may be implemented by hardware using one or a plurality of ICs etc.

The CPU 201 executes various types of processing for controlling the internal combustion engine according to the programs stored in the ROM 202.

In the NOx cleaning processing, fuel is temporarily injected into the exhaust pipe of the internal combustion engine to form a rich spike control state. In this state, the catalyst is exposed to a reducing atmosphere, and NOx accumulated in the catalyst is thereby reduced. When the NOx cleaning processing is performed (i.e., the operating state of the internal combustion engine is the rich spike control state), the internal combustion engine controller 200 (specifically the signal input/output unit 204) sends a rich spike signal Sr to the gas detection apparatus 1. The gas detection apparatus 1 can determine, based on whether or not the gas detection apparatus 1 is receiving the rich spike signal Sr, whether or not the operating state of the internal combustion engine is the rich spike control state.

[1-4. Sensor Element Unit]

Figure 3:
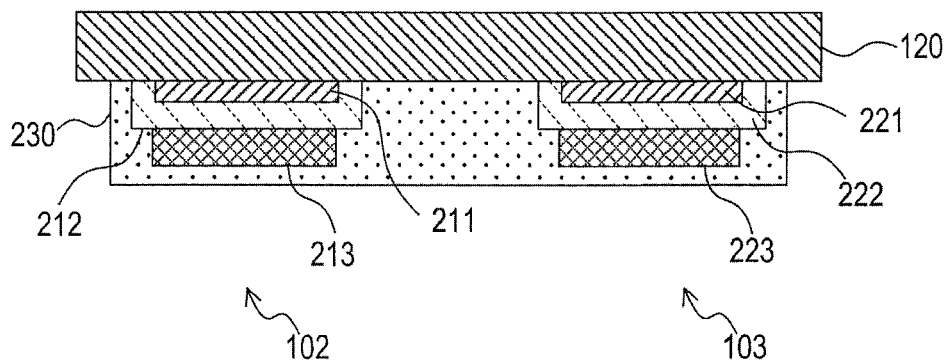
FIG. 3 is a cross-sectional view showing the structure of a first ammonia detection section and second ammonia detection section.

The sensor element unit 5 includes the NOx detection section 101, the first ammonia detection section 102, and the second ammonia detection section 103. The second ammonia detection section 103 is not shown in FIG. 2 but is shown in FIG. 3. The first ammonia detection section 102 and the second ammonia detection section 103 are disposed in parallel at substantially the same position as a reference electrode 143 in the longitudinal direction of the NOx detection section 101 (i.e., the horizontal direction in FIG. 2) in such a manner that the first ammonia detection section 102 and the second ammonia detection section 103 are located at different positions in the width direction of the NOx detection section 101 (i.e., the direction perpendicular to the sheet on which FIG. 2 is depicted). Therefore, in FIG. 2, of the first ammonia detection section 102 and the second ammonia detection section 103, only the first ammonia detection section 102 is shown.

The NOx detection section 101 is formed by sequentially stacking an insulating layer 113, a ceramic layer 114, an insulating layer 115, a ceramic layer 116, an insulating layer 117, a ceramic layer 118, an insulating layer 119, and an insulating layer 120. The insulating layers 113, 115, 117, 119, and 120 and the ceramic layers 114, 116, and 118 are formed mainly of alumina.

The NOx detection section 101 includes a first measurement chamber 121 formed between the ceramic layer 114 and the ceramic layer 116. In the NOx detection section 101, the exhaust gas is introduced from the outside into the interior of the first measurement chamber 121 through a diffusion resistor 122 that is disposed between the ceramic layer 114 and the ceramic layer 116 so as to be adjacent to the first measurement chamber 121. The diffusion resistor 122 is formed of a porous material such as alumina.

The NOx detection section 101 further includes a first pumping cell 130. The first pumping cell 130 includes a solid electrolyte layer 131 and pumping electrodes 132 and 133.

The solid electrolyte layer 131 is formed mainly of zirconia having oxygen ion conductivity. A part of the ceramic layer 114 is removed from a region exposed to the first measurement chamber 121. Instead of the ceramic layer 114, the solid electrolyte layer 131 is embedded in the resulting space.

The pumping electrodes 132 and 133 are formed mainly of platinum. The pumping electrode 132 is disposed on a surface of the solid electrolyte layer 131, which surface is exposed to the first measurement chamber 121. The pumping electrode 133 is disposed on the solid electrolyte layer 131 on the side opposite the pumping electrode 132 with the solid electrolyte layer 131 sandwiched between the pumping electrodes 132 and 133. The insulating layer 113 is removed from a region in which the pumping electrode 133 is disposed and from a region around the pumping electrode 133, and the resulting space is filled with a porous material 134 instead of the insulating layer 113. The porous material 134 allows gas (e.g., oxygen) migration between the pumping electrode 133 and the outside.

The NOx detection section 101 further includes an oxygen concentration detection cell 140. The oxygen concentration detection cell 140 includes a solid electrolyte layer 141, a detection electrode 142, and the reference electrode 143.

The solid electrolyte layer 141 is formed mainly of zirconia having oxygen ion conductivity. A part of the ceramic layer 116 is removed from a region on the rear end side (i.e., the right side of FIG. 2) of the solid electrolyte layer 131. Instead of the ceramic layer 116, the solid electrolyte layer 141 is embedded in the resulting space.

The detection electrode 142 and the reference electrode 143 are formed mainly of platinum. The detection electrode 142 is disposed on a surface of the solid electrolyte layer 141, which surface is exposed to the first measurement chamber 121. The reference electrode 143 is disposed on the solid electrolyte layer 141 on the side opposite the detection electrode 142 with the solid electrolyte layer 141 sandwiched between the detection electrode 142 and the reference electrode 143.

The NOx detection section 101 further includes a reference oxygen chamber 146. The reference oxygen chamber 146 is a through hole formed by removing the insulating layer 117 from a region in which the reference electrode 143 is disposed and from a region around the reference electrode 143.

The NOx detection section 101 further includes a second measurement chamber 148 disposed downstream of the first measurement chamber 121. The second measurement chamber 148 is formed rearward of the detection electrode 142 and the reference electrode 143 so as to pass through the solid electrolyte layer 141 and the insulating layer 117. In the NOx detection section 101, the exhaust gas discharged from the first measurement chamber 121 is introduced into the second measurement chamber 148.

The NOx detection section 101 includes a second pumping cell 150. The second pumping cell 150 includes a solid electrolyte layer 151 and pumping electrodes 152 and 153.

The solid electrolyte layer 151 is formed mainly of zirconia having oxygen ion conductivity. The ceramic layer 118 is removed from a region exposed to the reference oxygen chamber 146 and the second measurement chamber 148 and a region around this exposed region. Instead of the ceramic layer 118, the solid electrolyte layer 151 is embedded in the resulting space.

The pumping electrodes 152 and 153 are formed mainly of platinum. The pumping electrode 152 is disposed on a surface of the solid electrolyte layer 151, which surface is exposed to the second measurement chamber 148. The pumping electrode 153 is disposed on the solid electrolyte layer 151 such that the pumping electrode 153 faces the reference electrode 143 with the reference oxygen chamber 146 therebetween. A porous material 147 is disposed inside the reference oxygen chamber 146 so as to cover the pumping electrode 153.

The NOx detection section 101 includes a heater 160. The heater 160 is a heat-generating resistor that is formed mainly of platinum and generates heat when energized and is disposed between the insulating layers 119 and 120.

The first ammonia detection section 102 is formed on the outer surface of the NOx detection section 101, more specifically on the insulating layer 120. The first ammonia detection section 102 is disposed at substantially the same position, with respect to the direction of the axial line O (i.e., the horizontal direction in FIG. 2), as the reference electrode 143 in the NOx detection section 101.

The first ammonia detection section 102 includes a first reference electrode 211 formed on the insulating layer 120, a first solid electrolyte body 212 covering the front and side surfaces of the first reference electrode 211, and a first detection electrode 213 formed on the front surface of the first solid electrolyte body 212. Similarly, as shown in FIG. 3, the second ammonia detection section 103 includes a second reference electrode 221 formed on the insulating layer 120, a second solid electrolyte body 222 covering the front and side surfaces of the second reference electrode 221, and a second detection electrode 223 formed on the front surface of the second solid electrolyte body 222.

The first reference electrode 211 and the second reference electrode 221 are formed mainly of platinum used as an electrode material and more specifically formed of a material containing Pt and zirconium oxide. The first solid electrolyte body 212 and the second solid electrolyte body 222 are formed of an oxygen ion-conductive material such as yttria-stabilized zirconia. The first detection electrode 213 and the second detection electrode 223 are formed mainly of gold used as an electrode material and more specifically formed of a material containing Au and zirconium oxide. The electrode materials of the first detection electrode 213 and the second detection electrode 223 are selected such that the first ammonia detection section 102 and the second ammonia detection section 103 differ from each other in terms of the ratio between the sensitivity to ammonia and the sensitivity to NOx.

The first ammonia detection section 102 and the second ammonia detection section 103 are covered with a porous protecting layer 230. The protecting layer 230 is configured to prevent adhesion of a poisoning material to the first detection electrode 213 and the second detection electrode 223 and to control the diffusion rate of ammonia flowing from the outside into the first ammonia detection section 102 and the second ammonia detection section 103. As described above, the first ammonia detection section 102 and the second ammonia detection section 103 function as mixed potential sensing sections.

[1-5. Sensor Control Unit]

As shown in FIG. 2, the sensor control unit 3 includes a control circuit 180 and a microcomputer 190.

The control circuit 180 is an analog circuit disposed on a circuit board. The control circuit 180 includes an Ip1 drive circuit 181, a Vs detection circuit 182, a reference voltage comparison circuit 183, an Icp supply circuit 184, a Vp2 application circuit 185, an Ip2 detection circuit 186, a heater drive circuit 187, and an electromotive force detection circuit 188.

The pumping electrode 132, the detection electrode 142, and the pumping electrode 152 are connected to a reference potential. The pumping electrode 133 is connected to the Ip1 drive circuit 181. The reference electrode 143 is connected to the Vs detection circuit 182 and the Icp supply circuit 184. The pumping electrode 153 is connected to the Vp2 application circuit 185 and the Ip2 detection circuit 186. The heater 160 is connected to the heater drive circuit 187.

The Ip1 drive circuit 181 applies a voltage Vp1 between the pumping electrode 132 and the pumping electrode 133 to supply a first pumping current Ip1 and detects the supplied first pumping current Ip1.

The Vs detection circuit 182 detects the voltage Vs between the detection electrode 142 and the reference electrode 143 and outputs the detection result to the reference voltage comparison circuit 183.

The reference voltage comparison circuit 183 compares a reference voltage (e.g., 425 mV) with the output from the Vs detection circuit 182 (i.e., the voltage Vs) and outputs the comparison result to the Ip1 drive circuit 181. The Ip1 drive circuit 181 controls the direction and magnitude of the first pumping current Ip1 such that the voltage Vs becomes equal to the reference voltage to thereby adjust the concentration of oxygen in the first measurement chamber 121 to a prescribed value at which decomposition of NOx does not occur.

The Icp supply circuit 184 causes a weak current Icp to flow between the detection electrode 142 and the reference electrode 143. Oxygen is thereby fed from the first measurement chamber 121 to the reference oxygen chamber 146 through the solid electrolyte layer 141, and the concentration of oxygen in the reference oxygen chamber 146 is set to be a prescribed oxygen concentration serving as a reference.

The Vp2 application circuit 185 applies a constant voltage Vp2 (e.g., 450 mV) between the pumping electrode 152 and the pumping electrode 153. In the second measurement chamber 148, NOx is dissociated through the catalytic action of the pumping electrodes 152 and 153 of the second pumping cell 150. The oxygen ions obtained as a result of the dissociation migrate in the solid electrolyte layer 151 between the pumping electrode 152 and the pumping electrode 153, so that a second pumping current Ip2 flows. The Ip2 detection circuit 186 detects the second pumping current Ip2.

The heater drive circuit 187 applies a positive voltage for heater energization to one end of the heater 160, which is a heat-generating resistor, and applies a negative voltage for heater energization to the other end of the heater 160 to thereby drive the heater 160.

The electromotive force detection circuit 188 detects the electromotive force between the first reference electrode 211 and the first detection electrode 213 (hereinafter referred to as a first ammonia electromotive force) and the electromotive force between the second reference electrode 221 and the second detection electrode 223 (hereinafter referred to as a second ammonia electromotive force), and outputs signals representing the detection results (ammonia detection signals Sa) to the microcomputer 190.

The microcomputer 190 includes a CPU 191, a ROM 192, a RAM 193, and a signal input/output unit 194. The CPU 191 executes programs stored in a non-transitory tangible recording medium to implement various functions of the microcomputer. In the present example, the ROM 192 corresponds to the non-transitory tangible recording medium in which the programs are stored. When one of the programs is executed, a method corresponding to the program is executed. The number of microcomputers included in the sensor control unit 3 may be one or may be two or more. Part or all of the functions executed by the microcomputer 190 may be implemented by hardware using one or a plurality of ICs, etc.

The CPU 191 executes a process for controlling the sensor element unit 5 according to a program stored in the ROM 192. The signal input/output unit 194 is connected to the Ip1 drive circuit 181, the Vs detection circuit 182, the Ip2 detection circuit 186, the heater drive circuit 187, and the electromotive force detection circuit 188. The signal input/output unit 194 converts the voltage values of analog signals from the Ip1 drive circuit 181, the Vs detection circuit 182, the Ip2 detection circuit 186, and the electromotive force detection circuit 188 to digital data and outputs the digital data to the CPU 191.

The CPU 191 outputs a driving signal to the heater drive circuit 187 through the signal input/output unit 194 so as to control the electric power supplied to the heater 160 by means of pulse width modulation such that the heater 160 reaches a target temperature. To control the electric power supplied to the heater 160, any known method may be used. Specifically, the impedance of a cell (e.g., the oxygen concentration detection cell 140) included in the NOx detection section 101 is detected, and then the amount of the electric power supplied is controlled such that the impedance detected reaches a target value.

The CPU 191 reads various data from the ROM 192 and performs various computation processes on the basis of the value of the first pumping current Ip1, the value of the second pumping current Ip2, the value of the first ammonia electromotive force, and the value of the second ammonia electromotive force.

The ROM 192 stores a "first ammonia electromotive force—first ammonia concentration output relational expression," a "second ammonia electromotive force—second ammonia concentration output relational expression," a "first pumping current—oxygen concentration relational expression," a "second pumping current—NOx concentration output relational expression," a "first ammonia concentration output & second ammonia concentration output & oxygen concentration—corrected ammonia concentration relational expression," a "first ammonia concentration output & second ammonia concentration output & oxygen concentration—corrected $NO_2$ concentration relational expression," and an "NOx concentration output & corrected ammonia concentration & corrected $NO_2$ concentration—corrected NOx concentration relational expression."

The "first ammonia concentration output & second ammonia concentration output & oxygen concentration—corrected ammonia concentration relational expression" corresponds to correction expression (1) below. The "first ammonia concentration output & second ammonia concentration output & oxygen concentration—corrected $NO_2$ concentration relational expression" corresponds to correction expression (2) below. The "NOx concentration output & corrected ammonia concentration & corrected $NO_2$ concentration—corrected NOx concentration relational expression" corresponds to correction expression (3) below.

The various data may be set in the form of predetermined relational expressions as described above or may be set in other forms (for example, tables) so long as various gas concentrations can be calculated from the outputs of the sensor. Alternatively, they may be values obtained through the use of a model gas whose gas concentration is known.

The "first ammonia electromotive force—first ammonia concentration output relational expression" and the "second ammonia electromotive force—second ammonia concentration output relational expression" are expressions representing the relation between the ammonia electromotive forces outputted from the first ammonia detection section 102 and the second ammonia detection section 103 and the ammonia concentration outputs.

The "first pumping current—oxygen concentration relational expression" is an expression representing the relation between the first pumping current and the oxygen concentration (i.e., the $O_2$ concentration) in the exhaust gas. The "second pumping current—NOx concentration output relational expression" is an expression representing the relation between the second pumping current and the NOx concentration output.

The "first ammonia concentration output & second ammonia concentration output & oxygen concentration—corrected ammonia concentration relational expression" is an expression representing the relation between the first and second ammonia concentration outputs affected by the oxygen concentration, the ammonia concentration, and the $NO_2$ concentration and the corrected ammonia concentration from which the influences of the oxygen concentration and the $NO_2$ concentration have been removed. The "first ammonia concentration output & second ammonia concentration output & oxygen concentration—corrected $NO_2$ concentration relational expression" is an expression representing the relation between the first and second ammonia concentration outputs affected by the oxygen concentration, the ammonia concentration, and the $NO_2$ concentration and the corrected $NO_2$ concentration from which the influences of the oxygen concentration and the ammonia concentration have been removed. The "NOx concentration output & corrected ammonia concentration & corrected $NO_2$ concentration—corrected NOx concentration relational expression" is an expression representing the relation between the NOx concentration output affected by the ammonia concentration and the $NO_2$ concentration and the corrected NOx concentration from which the influences of the ammonia concentration and the $NO_2$ concentration have been removed.

A description will next be given of a computation process for determining the $NO_2$ concentration, the NOx concentration, and the ammonia concentration from the first pumping current Ip1, the second pumping current Ip2, the first ammonia electromotive force, and the second ammonia electromotive force. This computation process is executed by the CPU 191 of the microcomputer 190.

When the first pumping current Ip1, the second pumping current Ip2, the first ammonia electromotive force, and the second ammonia electromotive force are inputted, the CPU 191 performs a computation process for determining the oxygen concentration, the NOx concentration output, the first ammonia concentration output, and the second ammonia concentration output. Specifically, the CPU 191 calls the "first ammonia electromotive force—first ammonia concentration output relational expression," the "second ammonia electromotive force—second ammonia concentration output relational expression," the "first pumping current Ip1—oxygen concentration relational expression," and the "second pumping current Ip2—NOx concentration output relational expression" from the ROM 192 and then calculates the oxygen concentration and other concentration outputs using these relational expressions.

The "first ammonia electromotive force—first ammonia concentration output relational expression" and the "second ammonia electromotive force—second ammonia concentration output relational expression" are set such that, over the entire possible range of the ammonia electromotive forces outputted from the first and second ammonia detection sections 102 and 103 in their use environment, an approximately linear relation is present between each of the ammonia concentration outputs from the first and second ammonia detection sections 102 and 103 and the ammonia concentration in the measurement gas (exhaust gas). Since these conversion expressions are used for conversion, in the correction expressions below, calculation which utilizes changes in gradient and offset is possible.

After the oxygen concentration, the NOx concentration output, the first ammonia concentration output, and the second ammonia concentration output are determined, the CPU 191 performs computations using the correction expressions described below to determine the ammonia concentration, $NO_2$ concentration, and NOx concentration in the exhaust gas.

$$x = F(A, B, D)$$
$$= (eA - c) * (jB - h - fA + d) /$$
$$(eA - c - iB + g) + fA - d$$
Correction expression (1)

$$y = F'(A, B, D)$$
$$= (jB - h - fA + d) /$$
$$(eA - c - iB + g)$$
Correction expression (2)

$$z = C - ax + by$$
Correction expression (3)

In these correction expressions, x represents the ammonia concentration, y represents the $NO_2$ concentration, and z represents the NOx concentration. A represents the first ammonia concentration output, B represents the second ammonia concentration output, C represents the NOx concentration output, and D represents the oxygen concentration. F in the correction expression (1) represents that x is a function of A, B, and D, and F' in the correction expression (2) represents that y is a function of A, B, and D. a and b are correction coefficients, and c, d, e, f, g, h, and j are coefficients calculated using the oxygen concentration D (i.e., coefficients determined by D).

The CPU 191 determines the ammonia concentration, the $NO_2$ concentration, and the NOx concentration in the exhaust gas by substituting the first ammonia concentration output, the second ammonia concentration output, the NOx concentration output, and the oxygen concentration into the above-described correction expressions (1) to (3).

The correction expressions (1) and (2) are determined on the basis of the characteristics of the first and second ammonia detection sections 102 and 103, and the correction expression (3) is determined on the basis of the characteristics of the NOx detection section 101. The correction expressions (1) to (3) are merely examples, and other correction expressions, coefficients, etc. may be appropriately used in accordance with the characteristics of gas detection.

[1-6. Gas Concentration Computation Processing and Signal Use Suspension Determination Processing]

The microcomputer 190 in the sensor control unit 3 executes gas concentration computation processing and signal use suspension determination processing. After the electric power is supplied to the heater 160 and the sensor element unit 5 is heated to its activation temperature by the heat generated by the heater 160, each of the gas concentration computation processing and the signal use suspension determination processing is executed every time an execution period elapses. In the present embodiment, the execution period is 50 ms.

The steps of the gas concentration computation processing will be described.

Figure 4:
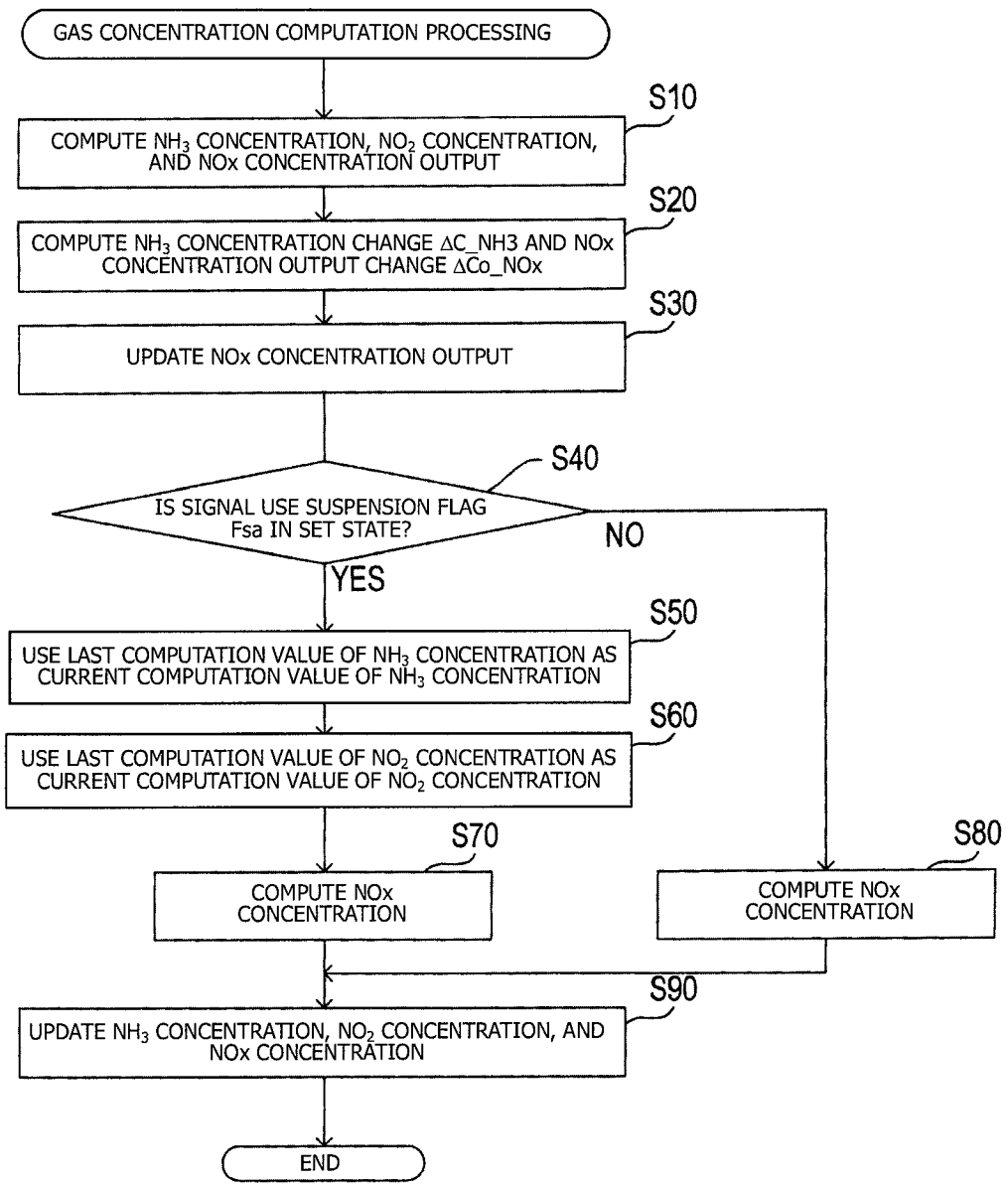
FIG. 4 is a flowchart showing gas concentration computation processing.

As shown in FIG. 4, when the gas concentration computation processing is executed, in S10, the CPU 191 of the microcomputer 190 first acquires the results of detection of the first pumping current Ip1, the second pumping current Ip2, the first ammonia electromotive force, and the second ammonia electromotive force from the control circuit 180 and performs the above-described computations to compute the ammonia concentration, the $NO_2$ concentration, and the NOx concentration output. In S10, the result of the computation of the ammonia concentration is stored in a storage area for computed ammonia concentration C_NH3_CAL provided in the RAM 193. In S10, the result of the computation of the $NO_2$ concentration is stored in a storage area for computed $NO_2$ concentration C_NO2_CAL provided in the RAM 193. In S10, the result of the computation of the NOx concentration output is stored in a storage area for computed NOx concentration output Co_NOx_CAL provided in the RAM 193.

Next, in S20, the CPU 191 computes the value of ammonia concentration change $\Delta$C_NH3 and the value of NOx concentration output change $\Delta$Co_NOx. Specifically, through use of the value stored in a memory area for ammonia concentration C_NH3 provided in the RAM 193, the CPU 191 computes the value of ammonia concentration change $\Delta$C_NH3 in accordance with formula (1) below. Also, through use of the value stored in a memory area for NOx concentration output four periods ago Co_NOx_4 (described later) provided in the RAM 193, the CPU 191 computes the value of NOx concentration output change $\Delta$Co_NOx in accordance with formula (2) below.

$$\Delta C\_NH3 = C\_NH3\_CAL - C\_NH3 \quad (1)$$

$$\Delta Co\_NOx = Co\_NOx\_CAL - Co\_NOx\_4 \quad (2)$$

Ammonia concentration C_NH3 represents the latest ammonia concentration before the value of computed ammonia concentration C_NH3_CAL is computed.

A memory area for $NO_2$ concentration C_NO2 is provided in the RAM 193. $NO_2$ concentration C_NO2 represents the latest $NO_2$ concentration before the value of computed $NO_2$ concentration C_NO2_CAL is computed.

Respective memory areas for NOx concentration output Co_NOx, NOx concentration output one period ago Co_NOx_1, NOx concentration output two periods ago Co_NOx_2, NOx concentration output three periods ago Co_NOx_3, and NOx concentration output four periods ago Co_NOx_4 are provided in the RAM 193.

NOx concentration output Co_NOx represents the latest NOx concentration output before the value of computed NOx concentration output Co_NOx_CAL is computed.

NOx concentration output one period ago Co_NOx_1 represents the NOx concentration output computed one execution period before (i.e., 50 ms before) the computation of the value of NOx concentration output Co_NOx. NOx concentration output two periods ago Co_NOx_2 represents the NOx concentration output computed two execution periods before (i.e., 100 ms before) the computation of the value of NOx concentration output Co_NOx. NOx concentration output three periods ago Co_NOx_3 represents the NOx concentration output computed three execution periods before (i.e., 150 ms before) the computation of the value of NOx concentration output Co_NOx.

NOx concentration output four periods ago Co_NOx_4 represents the NOx concentration output computed four execution periods before (i.e., 200 ms before) the computation of the value of NOx concentration output Co_NOx. Namely, NOx concentration output four periods ago Co_NOx_4 represents the NOx concentration output computed five execution periods before (i.e., 250 ms before) the computation of the value of computed NOx concentration output Co_NOx_CAL.

In S30, the CPU 191 reads the value stored in the memory area for NOx concentration output three periods ago Co_NOx_3 and stores it in the memory area for NOx concentration output four periods ago Co_NOx_4. The CPU 191 reads the value stored in the memory area for NOx concentration output two periods ago Co_NOx_2 and stores it in the memory area for NOx concentration output three periods ago Co_NOx_3. The CPU 191 reads the value stored in the memory area for NOx concentration output one period ago Co_NOx_1 and stores it in the memory area for NOx concentration output two periods ago Co_NOx_2. The CPU 191 reads the value stored in the memory area for NOx concentration output Co_NOx and stores it in the memory area for NOx concentration output one period ago Co_NOx_1. The CPU 191 reads the value stored in the memory area for computed NOx concentration output Co_NOx_CAL and stores it in the memory area for NOx concentration output Co_NOx.

In S40, the CPU 191 determines whether or not a signal use suspension flag Fsa provided in the RAM 193 is in a set state. The signal use suspension flag Fsa is set or cleared in the signal use suspension determination processing described later.

If the signal use suspension flag Fsa is in the set state (YES in S40), in S50, the CPU 191 reads the value stored in the memory area for ammonia concentration C_NH3 and stores it in the memory area for computed ammonia concentration C_NH3_CAL. Specifically, the last computation value of the ammonia concentration is used as the current computation value of the ammonia concentration.

In S60, the CPU 191 reads the value stored in the memory area for $NO_2$ concentration C_NO2 and stores it in the memory area for computed $NO_2$ concentration C_NO2_CAL. Specifically, the last computation value of the $NO_2$ concentration is used as the current computation value of the $NO_2$ concentration.

In S70, through use of the value currently stored in the memory area for NOx concentration output Co_NOx, the value currently stored in the memory area for ammonia concentration C_NH3, and the value currently stored in the memory area for $NO_2$ concentration C_NO2, the CPU 191 computes the NOx concentration in accordance with the correction expression (3) above. Namely, the CPU 191 computes the NOx concentration using the last computation value of the ammonia concentration and the last computation value of the $NO_2$ concentration. The CPU 191 stores the result of the computation of the NOx concentration in the memory area for computed NOx concentration C_NOx_CAL provided in the RAM 193, and proceeds to S90.

If the signal use suspension flag Fsa is not in the set state (NO in S40), through use of the ammonia concentration, $NO_2$ concentration, and NOx concentration output computed in S10, the CPU 191 computes the NOx concentration in accordance with the above-described correction expression (3) in S80. The CPU 191 stores the result of the computation of the NOx concentration in the memory area for computed NOx concentration C_NOx_CAL provided in the RAM 193, and proceeds to S90.

In S90, the CPU 191 updates the value of ammonia concentration C_NH3, the value of $NO_2$ concentration C_NO2, and the value of NOx concentration C_NOx. Specifically, the CPU 191 reads the value stored in the memory area for computed ammonia concentration C_NH3_CAL and stores it in the memory area for ammonia concentration C_NH3. The CPU 191 reads the value stored in the memory area for computed $NO_2$ concentration C_NO2_CAL and stores it in the memory area for $NO_2$ concentration C_NO2. The CPU 191 reads the value stored in the memory area for computed NOx concentration C_NOx_CAL and stores it in the memory area for NOx concentration C_NOx.

After completion of the processing in S90, the CPU 191 ends the current execution of the gas concentration computation processing.

The microcomputer 190 of the sensor control unit 3 transmits the $NO_2$ concentration, the NOx concentration, and the ammonia concentration obtained by execution of the gas concentration computation processing to the internal combustion engine controller 200 as an $NO_2$ concentration signal Sg1, an NOx concentration signal Sg2, and an ammonia concentration signal Sg3, respectively.

Next, the steps of the signal use suspension determination processing will be described.

Figure 5:
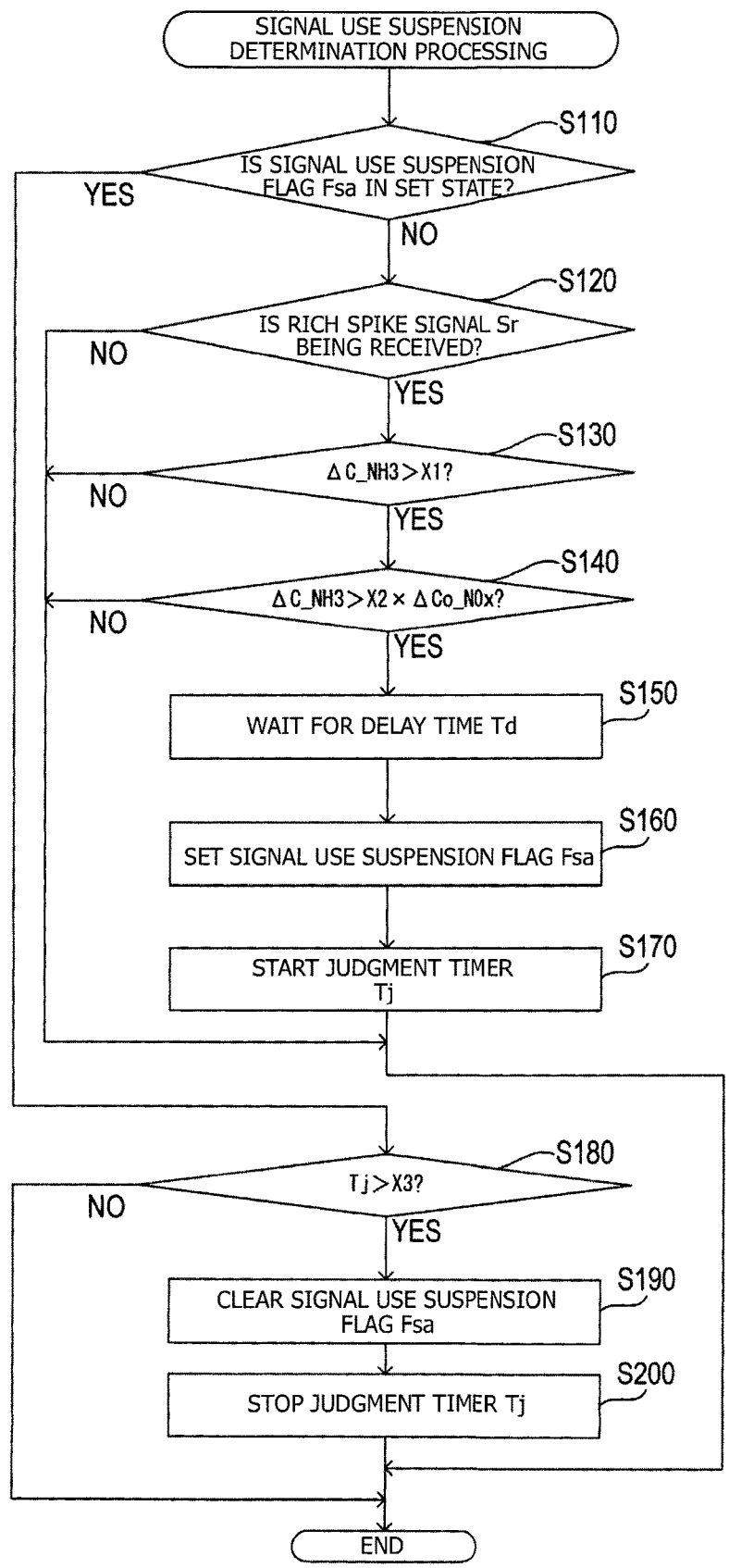
FIG. 5 is a flowchart showing signal use suspension determination processing.

As shown in FIG. 5, when the signal use suspension determination processing is executed, the CPU 191 of the microcomputer 190 determines in S110 whether or not the signal use suspension flag Fsa is in the set state. If the signal use suspension flag Fsa is not in the set state, the CPU 191 determines in S120 whether or not the rich spike signal Sr is being received.

If the rich spike signal Sr is not being received, the CPU 191 ends the current execution of the signal use suspension determination processing. If the rich spike signal Sr is being received, the CPU 191 determines in S130 whether or not the value of ammonia concentration change ΔC_NH3 is larger than a preset diagnosis start determination value X1.

If the value of ammonia concentration change ΔC_NH3 is equal to or less than the diagnosis start determination value X1, the CPU 191 ends the current execution of the signal use suspension determination processing. If the value of ammonia concentration change ΔC_NH3 is larger than the diagnosis start determination value X1, the CPU 191 determines in S140 whether or not the value of ammonia concentration change ΔC_NH3 is larger than the product of a preset diagnosis start determination coefficient X2 and the NOx concentration output change ΔCo_NOx. The diagnosis start determination coefficient X2 is set to a value larger than 1.

If the value of ammonia concentration change ΔC_NH3 is equal to or less than the product of the diagnosis start determination coefficient X2 and the NOx concentration output change ΔCo_NOx, the CPU 191 ends the current execution of the signal use suspension determination processing. If the value of ammonia concentration change ΔC_NH3 is larger than the product of the diagnosis start determination coefficient X2 and the NOx concentration output change ΔCo_NOx, the CPU 191 waits for a predetermined delay time Td in S150. The delay time Td is set to the time required for the exhaust gas for NOx cleaning to reach the multi-gas sensor 2 after the internal combustion engine controller 200 starts the NOx cleaning processing and transmits the rich spike signal Sr to the sensor control unit 3. The delay time Td may be set using an actual measured value of the required time that is obtain by actual measurement or may be set using a computational value of the required time that is computed based on the path length of the exhaust pipe from a cylinder to the multi-gas sensor 2. In the present embodiment, the delay time Td is a value corresponding to, for example, 2 seconds.

In S160, the CPU 191 sets the signal use suspension flag Fsa. In S170, the CPU 191 starts a judgment timer Tj provided in the RAM 193, and ends the current execution of the signal use suspension determination processing. The judgment timer Tj is incremented, for example, every 10 ms. After the judgment timer Tj is started, its value is incremented from 0 (i.e., one is added).

If the CPU 191 determines in S110 that the signal use suspension flag Fsa is in the set state, the CPU 191 determines in S180 whether or not the value of the judgment timer Tj is larger than a preset continuation determination value X3. In the present embodiment, the continuation determination value X3 is a value corresponding to, for example, 2 seconds.

If the value of the judgment timer Tj is equal to or less than the continuation determination value X3, the CPU 191 ends the current execution of the signal use suspension determination processing. If the value of the judgment timer Tj is larger than the continuation determination value X3, the CPU 191 clears (resets) the signal use suspension flag Fsa in S190. Further, the CPU 191 stops the increment of the judgment timer Tj in S200, and ends the current execution of the signal use suspension determination processing.

In the case where, as a result of execution of the signal use suspension determination processing, the CPU 191 determines that the rich spike signal Sr is being received (YES in S120) and that the value of the ammonia concentration change $\Delta C\_NH3$ satisfies the prescribed conditions (YES in S130 and YES in S140), the CPU 191 waits for the delay time Td, and then sets the signal use suspension flag Fsa. Subsequently, when the CPU 191 determines that the prescribed time (the continuation determination value X3) has elapsed (YES in S180), the CPU 191 clears the signal use suspension flag Fsa. Namely, in the signal use suspension determination processing, the processing of changing the state of the signal use suspension flag Fsa (i.e., setting or clearing the flag) is executed on the basis of the result of the determination as to whether or not the conditions that "the operating state of the internal combustion engine is the rich spike state and there is a possibility that erroneous determination may occur due to the influence of a flammable gas in the exhaust gas" are satisfied. The CPU 191 determines whether to clear the signal use suspension flag Fsa based on the elapsed time after the signal use suspension flag Fsa has been set.

[1-7. Effects when the Signal Use Suspension Determination Processing is Used]

Figure 6:
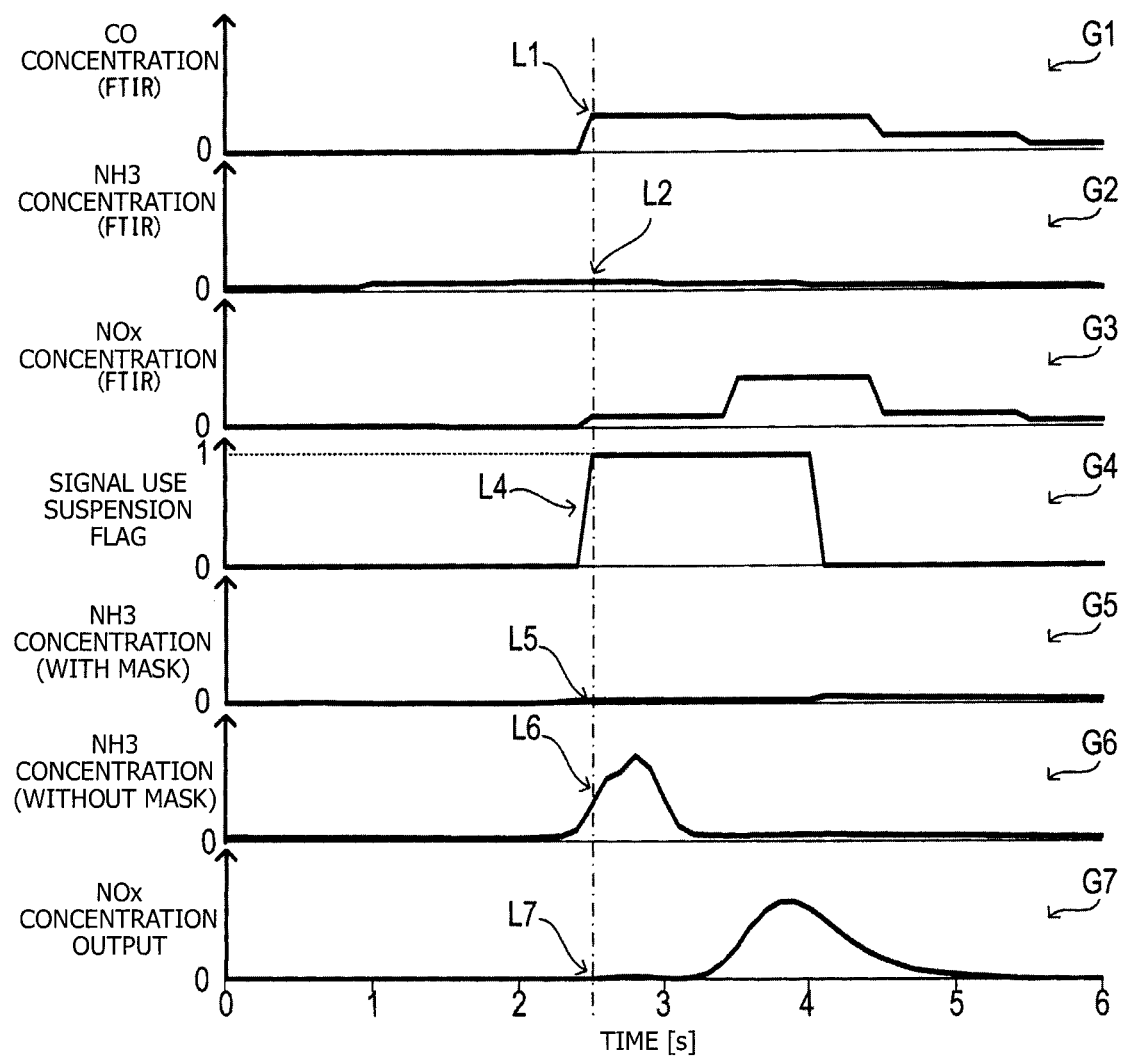
FIG. 6 is a series of graphs showing changes in ammonia concentration, NOx concentration, CO concentration, signal use suspension flag, etc. with time.

FIG. 6 shows graphs illustrating the effects obtained when the signal use suspension determination processing is used.

Graph G1 in FIG. 6 shows changes in the concentration of carbon monoxide contained in the exhaust gas with time. Graph G2 in FIG. 6 shows changes in the concentration of ammonia contained in the exhaust gas with time. Graph G3 in FIG. 6 shows changes in the concentration of nitrogen oxide contained in the exhaust gas with time. Graphs G1, G2, and G3 show the results of measurement obtained using a Fourier transform infrared spectrometer.

Graph G4 in FIG. 6 shows changes in the signal use suspension flag Fsa with time. Graph G5 in FIG. 6 shows changes in the value of ammonia concentration C_NH3 with time when the signal use suspension determination processing is used. Graph G6 in FIG. 6 shows changes in the value of ammonia concentration C_NH3 with time when the signal use suspension determination processing is not used. Graph G7 in FIG. 6 shows changes in the value of NOx concentration output Co_NOx with time.

As shown by arrow L1 in graph G1, a steep rise in the concentration of carbon monoxide due to a rich spike occurs at around 2.6 seconds. As shown by arrow L2 in graph G2, almost no change in the ammonia concentration occurs at around 2.6 seconds. However, as shown by arrow L6 in graph G6, a steep rise in the ammonia concentration C_NH3 occurs at around 2.6 seconds despite that, as shown by arrow L2 in graph G2, almost no change in the concentration of ammonia contained in the exhaust gas occurs at around 2.6 seconds. As shown by arrow L7 in graph G7, almost no change in the value of NOx concentration output Co_NOx occurs at around 2.6 seconds.

Therefore, as shown by arrow L4 in graph G4, the signal use suspension flag Fsa is set at around 2.6 seconds. As shown by arrow L5 in graph G5, when the signal use suspension determination processing is used, almost no change in the value of ammonia concentration C_NH3 occurs at around 2.6 seconds.

As can be seen from the above results, the use of the signal use suspension determination processing can prevent changes in the detection value of the ammonia concentration due to the influence of the flammable gas (carbon monoxide), as compared with the case where the signal use suspension determination processing is not used.

[1-8. Effects]

As described above, the sensor control unit 3 of the gas detection apparatus 1 included in the internal combustion engine control system 300 of the present embodiment controls the first and second ammonia detection sections 102 and 103 that detect ammonia in the exhaust gas from the internal combustion engine and outputs, to the internal combustion engine controller 200, the ammonia concentration signal Sg3 according to the results of the detection by the first and second ammonia detection sections 102 and 103.

The ammonia concentration signal Sg3 represents the ammonia concentration computed based on the ammonia detection signals Sa according to the results of the detection by the first and second ammonia detection sections 102 and 103.

If the sensor control unit 3 determines that the rich spike signal Sr is being received (YES in S120) and determines that the value of ammonia concentration change $\Delta C\_NH3$ satisfies the prescribed conditions (YES in S130 and YES in S140), the sensor control unit 3 waits for the delay time Td, and then sets the signal use suspension flag Fsa. When the signal use suspension flag Fsa is set as described above, an affirmative determination is made in S40 of the gas concentration computation processing (the result of determination in S40 becomes "YES"), so that the gas concentration computation processing is ended without execution of the processing of updating the ammonia concentration (S50). In this case, the ammonia concentration signal Sg3 representing the ammonia concentration computed based on the ammonia detection signals Sa detected during the period in which the signal use suspension flag Fsa is in the set state is not outputted to the internal combustion engine controller 200.

Namely, when the sensor control unit 3 determines that the rich spike signal Sr is receiving and that the value of ammonia concentration change $\Delta C\_NH3$ satisfies the prescribed conditions, the sensor control unit 3 suspends at least temporarily the output of the ammonia detection signals Sa detected after the determination (specifically, the ammonia concentration signal Sg3 representing the ammonia concentration computed based on the ammonia detection signals Sa) to the internal combustion engine controller 200.

This can prevent ammonia detection based on the ammonia detection signals Sa changed by the influence of the specific gas (such as a flammable gas). Therefore, with the sensor control unit 3, false detection of ammonia due to the influence of the specific gas (such as a flammable gas) can be prevented, and a reduction in the accuracy of detection of ammonia can be prevented.

With the sensor control unit 3, even when the first and second ammonia detection sections 102 and 103 output their respective ammonia detection signals Sa that vary according to both the concentration of ammonia and the concentration of the flammable gas, a reduction in the accuracy of computation of the ammonia concentration when a rich spike occurs can be prevented.

Next, in the case where the sensor control unit 3 determines that the rich spike signal Sr is receiving and that the value of ammonia concentration change ΔC_NH3 satisfies the prescribed conditions (YES in all S120, S130, and S140), the sensor control unit 3 does not set the signal use suspension flag Fsa immediately after the determinations. The sensor control unit 3 sets the signal use suspension flag Fsa at a point in time (a suspension initiation time) later than the state determination time by the delay time Td. Specifically, the sensor control unit 3 is configured to initiate the suspension of the use of the ammonia detection signals Sa at the suspension initiation time later than the time at which the sensor control unit 3 determines that the rich spike signal Sr is receiving.

Some internal combustion engines have a structure in which a time delay occurs between the time the reception of the rich spike signal Sr is started and the time the specific gas (flammable gas) actually reaches the multi-gas sensor 2 (the first and second ammonia detection sections 102 and 103) and causes the ammonia detection signals Sa to vary. In an internal combustion engine having such a structure, when the suspension of the use of the ammonia detection signals Sa is initiated not at the reception determination time of the rich spike signal Sr but at the suspension initiation time later than the reception determination time of the rich spike signal Sr, the start time of the period of suspension of use of the ammonia detection signals Sa can be set to an appropriate time.

In this manner, the sensor control unit 3 can output the ammonia concentration signal Sg3 computed based on the ammonia detection signals Sa corresponding to the detection results to the internal combustion engine controller 200 until the time at which the ammonia detection signals Sa change due to the influence of the specific gas (such as the flammable gas), and this can extend the period of time during which ammonia can be detected.

Next, in the case where the sensor control unit 3 determines that the prescribed use suspension period (the continuation determination value X3) has elapsed (YES in S180) after the signal use suspension flag Fsa has been set (S160), the sensor control unit 3 clears the signal use suspension flag Fsa. Specifically, the sensor control unit 3 is configured to terminate the suspension of the use of the ammonia detection signals Sa after lapse of the prescribed use suspension period from the initiation of the suspension of the use of the ammonia detection signals Sa.

In the sensor control unit 3, the initiation time of the suspension of the use of the ammonia detection signals Sa is determined on the basis of the rich spike signal Sr. Then the use of the ammonia detection signals Sa can be suspended over the use suspension period by measuring the elapsed time without detecting the rich spike signal Sr.

[1-9. Correspondence Between Terms]

A description will be given of the correspondence between terms used in the present embodiment and terms used in the claims.

The sensor control unit 3 is an example of the sensor controller, and the internal combustion engine controller 200 is an example of the external device. The first ammonia detection section 102 and the second ammonia detection section 103 are examples of the ammonia sensor as well as the first detection section. The NOx detection section 101 is an example of the second detection section, and the ammonia detection signals Sa or the ammonia concentration signal Sg3 is an example of the ammonia detection signal.

The microcomputer 190 that executes S120 is an example of the signal reception determination section, and the microcomputer 190 that executes S150, S160, S170, S180, S190, and S40 is an example of the use suspension section. The rich spike signal Sr is an example of the specific state signal. The microcomputer 190 that executes S10 is an example of the first computation unit as well as the second computation unit, and the microcomputer 190 that executes S130 and S140 is an example of the flammable gas determination section.

2. Second Embodiment

An internal combustion engine control system including a gas detection apparatus (specifically, a sensor control unit) that executes second signal use suspension determination processing instead of the signal use suspension determination processing of the first embodiment will be described as a second embodiment. The internal combustion engine control system in the second embodiment includes the gas detection apparatus and an internal combustion engine controller (ECU), and the hardware configuration of the second embodiment is the same as that of the first embodiment. In the following description, differences from the first embodiment will be mainly described.

The signal use suspension determination processing of the first embodiment is executed such that the state of the signal use suspension flag Fsa is changed (i.e., the flag is set or cleared) in the following manner. The signal use suspension flag Fsa is set upon satisfaction of the prescribed conditions (the rich spike signal Sr is being received and the value of ammonia concentration change ΔC_NH3 satisfies the prescribed conditions), and the signal use suspension flag Fsa is cleared after the prescribed time (the continuation determination value X3) elapses after the signal use suspension flag Fsa is set.

In the second signal use suspension determination processing of the second embodiment, the elapsed time after the signal use suspension flag Fsa has been set is not measured. The signal use suspension flag Fsa is maintained in the set state during reception of the rich spike signal Sr, and the signal use suspension flag Fsa is cleared when the rich spike signal Sr is no longer received.

Figure 7:
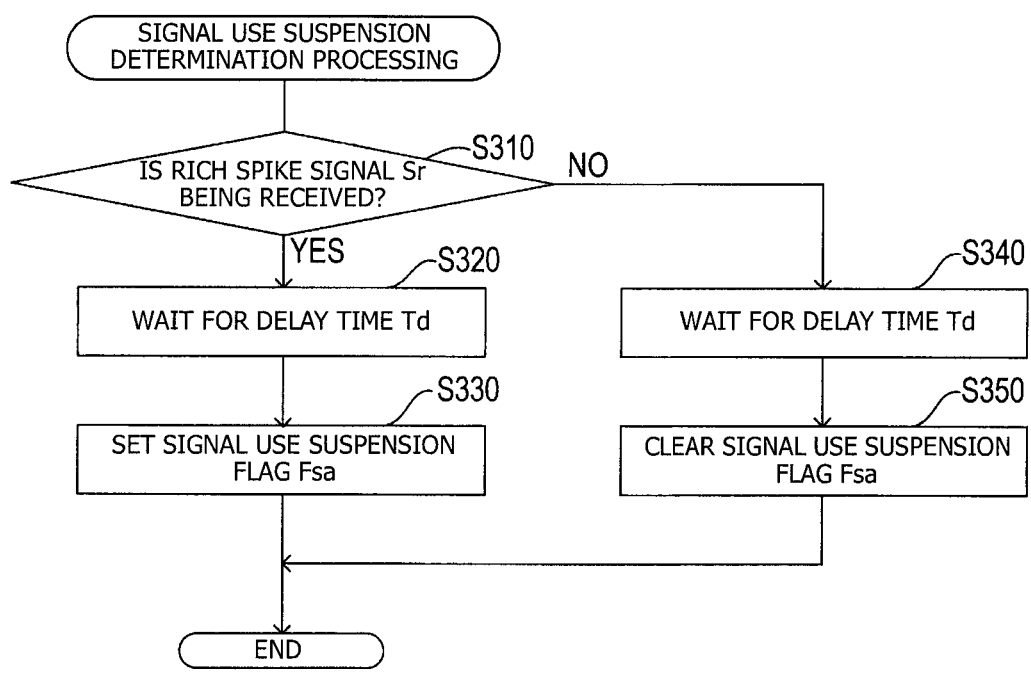
FIG. 7 is a flowchart showing second signal use suspension determination processing.

Specifically, as shown in FIG. 7, when the second signal use suspension determination processing is executed, the CPU 191 of the microcomputer 190 first determines in S310 whether or not the rich spike signal Sr is being received.

If the rich spike signal Sr is being received, the CPU 191 waits for a predetermined delay time Td in S320. This delay time Td is set based on the same idea as that in the first embodiment.

When the wait state over the delay time Td ends, the CPU 191 sets the signal use suspension flag Fsa in S330. After having set the signal use suspension flag Fsa, the CPU 191 ends the current execution of the second signal use suspension determination processing.

If the CPU 191 determines in S310 that the rich spike signal Sr is not being received, the CPU 191 waits for the predetermined delay time Td in S340 This delay time Td is set based on the same idea as that in the first embodiment.

When the wait state over the delay time Td ends, the CPU 191 clears the signal use suspension flag Fsa in S350. After having cleared the signal use suspension flag Fsa, the CPU 191 ends the current execution of the second signal use suspension determination processing.

The second signal use suspension determination processing is executed in the manner described above. In this case, if the rich spike signal Sr is being received (YES in S310), the signal use suspension flag Fsa is set. If the rich spike signal Sr is not being received (NO in S310), the signal use suspension flag Fsa is cleared. Namely, in the second signal use suspension determination processing, the processing of changing the state of the signal use suspension flag Fsa (i.e., setting or clearing the flag) is executed based on the result of the determination as to whether or not the condition "the operating state of the internal combustion engine is the rich spike state" is satisfied.

In the second signal use suspension determination processing, the determination as to whether to clear the signal use suspension flag Fsa is made not based on the elapsed time but based on the result of the determination as to whether or not the condition "the operating state of the internal combustion engine is not the rich spike state" is satisfied. In the second signal use suspension determination processing, a change in the concentration of oxygen in the exhaust gas is not used as a condition for determining whether to change the state of the signal use suspension flag Fsa.

The sensor control unit that executes the above-described second signal use suspension determination processing can set the state of the signal use suspension flag Fsa based only on the state of reception of the rich spike signal Sr, and therefore, the sensor control unit is not required to have the time measurement function.

The microcomputer 190 that executes S310 is an example of the signal reception determination section, and the microcomputer 190 that executes S320, S330, S340, and S350 is an example of the use suspension section.

3. Third Embodiment

An internal combustion engine control system 300 in which the signal use suspension determination processing is executed not by the gas detection apparatus 1 (the sensor control unit 3) but by the internal combustion engine controller 200 (specifically, the microcomputer 205) will be described as a third embodiment.

The internal combustion engine control system 300 of the third embodiment includes the gas detection apparatus 1 and the internal combustion engine controller 200 (the ECU 200), and the hardware configuration of the third embodiment is the same as that of the first embodiment. In the following description, differences from the first embodiment will be mainly described.

The sensor control unit 3 of the third embodiment executes gas concentration computation processing in which S40, S50, S60, and S70 of the gas concentration computation processing of the first embodiment are omitted and S80 is executed after S30. Namely, the sensor control unit 3 of the third embodiment executes the computations of the $NO_2$ concentration, the NOx concentration, and the ammonia concentration continuously without interruption and executes the processing of transmitting the $NO_2$ concentration signal Sg1, the NOx concentration signal Sg2, and the ammonia concentration signal Sg3 to the internal combustion engine controller 200 continuously without interruption.

The microcomputer 205 of the internal combustion engine controller 200 (the ECU 200) of the third embodiment executes the signal use suspension determination processing in which the determination in S120 in the signal use suspension determination processing of the first embodiment is changed to a determination as to "whether or not the rich spike signal Sr is being transmitted."

In the signal use suspension determination processing executed by the microcomputer 205 of the internal combustion engine controller 200 of the third embodiment, the determination as to whether or not the use of the ammonia concentration signal Sg3 received from the sensor control unit 3 is suspended is made based on the state of the signal use suspension flag Fsa. Specifically, in the signal use stop processing, the microcomputer 205 determines whether or not the signal use suspension flag Fsa is in the set state. If the microcomputer 205 determines that the signal use suspension flag Fsa is in the set state, the microcomputer 205 suspends the use of the ammonia concentration signal Sg3 received from the sensor control unit 3. If the microcomputer 205 determines that the signal use suspension flag Fsa is in the cleared state, the microcomputer 205 permits the use of the ammonia concentration signal Sg3 received from the sensor control unit 3.

When the internal combustion engine controller 200 configured as described above determines that the internal combustion engine is in the rich spike control state in which the exhaust gas may contain the specific gas (such as the flammable gas), the internal combustion engine controller 200 suspends at least temporarily the use of the ammonia concentration signal Sg3 for ammonia detection that is received after the determination. This can prevent the ammonia detection from being performed based on the ammonia concentration signal Sg3 changed by the influence of the specific gas.

Therefore, with this internal combustion engine controller 200, as with the sensor control unit 3 of the first embodiment, false detection of ammonia due to the influence of the specific gas (such as the flammable gas) can be prevented, and a reduction in the accuracy of detection of ammonia can be prevented.

With the internal combustion engine controller 200, as with the sensor control unit 3 of the first embodiment, even when the first and second ammonia detection sections 102 and 103 output their respective ammonia detection signals Sa that vary according to both the concentration of ammonia and the concentration of the flammable gas, a reduction in the accuracy of computation of the ammonia concentration when a rich spike occurs can be prevented.

In the internal combustion engine controller 200, as in the sensor control unit 3 of the first embodiment, the ammonia concentration signal Sg3 computed based on the ammonia detection signals Sa according to the detection results can be used until the time at which the ammonia detection signals Sa are changed due to the influence of the specific gas (such as the flammable gas), and this can extend the period of time during which ammonia can be detected.

In the internal combustion engine controller 200, as in the sensor control unit 3 of the first embodiment, the initiation time of the suspension of the use of the ammonia concentration signal Sg3 is determined on the basis of the rich spike signal Sr. Then the use of the ammonia concentration signal Sg3 can be suspended over the use suspension period by measuring the elapsed time without detecting the rich spike signal Sr.

The internal combustion engine controller 200 is an example of the internal combustion engine controller, and the signal input/output unit 204 is an example of the ammonia detection signal reception section. The microcomputer 205 that executes S120 is an example of the state determination section, and the microcomputer 205 that executes S150, S160, S170, S180, and S190 is an example of the use suspension section.

4. Other Embodiments

While the embodiments of the present invention have been described, the present invention is not limited to these embodiments. The present invention can be implemented in various forms so long as they fall within the technical scope of the invention.

For example, as for the signal use suspension determination processing in the first and third embodiments, the processing in S130 and the processing in S140 may be omitted, and the signal use suspension flag Fsa may be set based on the determination result in S120. Specifically, by setting the signal use suspension flag Fsa based only on the result of determination of the state of reception of the rich spike signal Sr without determining whether or not the ammonia concentration change ΔC_NH3 satisfies the prescribed conditions, an increase in the processing load on the microcomputer 190 by the computational processing for the ammonia concentration change ΔC_NH3 can be prevented.

In the signal use suspension determination processing (in the first and third embodiments) and the second signal use suspension determination processing (in the second embodiment), the steps for waiting for the delay time Td may be omitted.

Specifically, in an internal combustion engine configured such that no time delay occurs between the time the reception (transmission) of the rich spike signal Sr is started and the time the specific gas (flammable gas) actually reaches the multi-gas sensor 2 (the first and second ammonia detection sections 102 and 103) and causes the ammonia detection signals Sa to vary, the steps for waiting for the delay time Td can be omitted. In this case, the start time of the period of suspension of use of the ammonia detection signals Sa can be set to an appropriate time.

The second signal use suspension determination processing (in the second embodiment) may be modified as follows. When the determination in S310 is YES, a determination is made as to whether or not the value of ammonia concentration change ΔC_NH3 satisfies the prescribed conditions (the determination processing corresponding to those in S130 and S140 in the first embodiment). If the result of the determination is YES, the process proceeds to S320. If the result of the determination is NO, the process proceeds to S340 or S350.

The internal combustion engine controller 200 may be configured to include the functions of the sensor control unit 3 and may be directly connected to the multi-gas sensor 2 to control the multi-gas sensor 2. The microcomputer 205 of the internal combustion engine controller 200 may execute the gas concentration computation processing and the signal use suspension determination processing.

In this case, the microcomputer 205 that executes S10 corresponds to the first computation unit and also to the second computation unit, and the microcomputer 205 that executes S130 and S140 is an example of the flammable gas determination section.

In the above embodiments, the NOx detection section 101 and the ammonia detection sections 102 and 103 are used to determine whether or not the exhaust gas contains the flammable gas. However, the present invention is not limited to the determination using the NOx detection section and the ammonia detection sections. Instead of the NOx detection section, a flammable gas detection section that does not react to ammonia but outputs a concentration signal that varies according to the concentration of the flammable gas may be used. In this case, if the output value of the concentration signal outputted from the flammable gas detection section is larger, the exhaust gas can be determined to contain the flammable gas.

In the above embodiments, if the exhaust gas is determined to contain the flammable gas, the value of ammonia concentration C_NH3 is not updated, and the last value is used. However, the value of ammonia concentration C_NH3 may be set to 0 or set to a preset prescribed value.

A plurality of functions included in a single component in the above-described embodiments may be distributed to a plurality of components, or functions of a plurality of components may be integrated into one component. Part of the configuration in each of the above-described embodiments may be omitted. At least part of the configuration in each of the above-described embodiments may be added to the configuration of another embodiment or may replace the configuration of another embodiment. Any embodiments included in the technical ideas specified by the wording of the claims are defined as embodiments of the present disclosure.

The present discloser can be implemented as various forms such as the microcomputer 190 described above and as a system including the microcomputer 190 as a component, a program that causes the microcomputer 190 to function as a computer, a non-transitory tangible recording medium, e.g., a semiconductor memory, in which the program is stored, and a concentration computation method.

DESCRIPTION OF REFERENCE NUMERALS

1 . . . gas detection apparatus, 2 . . . multi-gas sensor, 3 . . . sensor control unit, 5 . . . sensor element unit, 101 . . . NOx detection section, 102 . . . first ammonia detection section, 103 . . . second ammonia detection section, 190 . . . microcomputer, 200 . . . internal combustion engine controller (ECU), 205 . . . microcomputer, 300 . . . internal combustion engine control system.

The invention claimed is:

1. A sensor controller that controls an ammonia sensor for detecting ammonia in exhaust gas from an internal combustion engine and outputs at least one of a detection result detected by the ammonia sensor and an ammonia detection signal corresponding to the detection result to an engine controller, the sensor controller comprising:
a signal reception determination section that determines whether or not the sensor controller has received a specific state signal that indicates a specific state in which the exhaust gas contains a specific gas that differs from ammonia and reacts with the ammonia sensor; and a use suspension section that, when the signal reception determination section determines that the sensor controller has received the specific state signal, suspends at least temporarily use of the detection result detected by the ammonia sensor after the determination by the signal reception determination section, wherein the specific state signal is a rich spike signal that indicates a rich spike control state in which fuel is temporarily injected into an exhaust pipe of the internal combustion engine, the use suspension section suspends at least temporarily use of the detection result based on processing of the rich spike signal received from the engine controller, and a change in a concentration of oxygen in the exhaust gas is not used for determining whether or not the sensor controller has received the specific state signal.

2. The sensor controller according to claim 1, wherein the use suspension section initiates the suspension of the use of the detection result at a suspension initiation time later than a time at which the signal reception determination section determines that the sensor controller has received the specific state signal.

3. The sensor controller according to claim 2, wherein the use suspension section terminates the suspension of the use of the detection result after lapse of a prescribed use suspension period from the initiation of the suspension of the use of the detection result.

4. The sensor controller according to claim 1, wherein
the ammonia sensor is provided as a first detection section and configured to output the detection result, which is a first concentration signal that varies according to both the concentration of the ammonia contained in the exhaust gas and the concentration of a flammable gas contained in the exhaust gas,
the sensor controller further comprises;
a second detection section that outputs a second concentration signal that varies according to one of the concentration of the ammonia contained in the exhaust gas and the concentration of the flammable gas contained in the exhaust gas, and
a flammable gas determination section configured to determine, on the basis of the first concentration signal output from the first detection section and the second concentration signal output from the second detection section, whether or not the exhaust gas contains the flammable gas, and
when the signal reception determination section determines that the sensor controller has received the specific state signal and the flammable gas determination section determines that the exhaust gas contains the flammable gas, the use suspension section suspends at least temporarily use of the detection result detected by the ammonia sensor after the determination by the signal reception determination section and the determination by the flammable gas determination section.

5. An internal combustion engine control system comprising:
an internal combustion engine controller that controls operating conditions of an internal combustion engine; and
the sensor controller according to claim 1, wherein
the ammonia sensor detects ammonia in exhaust gas from the internal combustion engine.

6. The sensor controller according to claim 1, wherein the use suspension section suspends at least temporarily use of the detection result when the signal reception determination section determines that a value of ammonia concentration change satisfies a prescribed condition.

7. The sensor controller according to claim 1, wherein the use suspension section suspends at least temporarily an output of an ammonia concentration signal to the engine controller after the determination by the signal reception determination section.

8. An internal combustion engine controller that controls operating conditions of an internal combustion engine, the internal combustion engine controller comprising:
an ammonia detection signal reception section that receives at least one of a detection result from an ammonia sensor that detects ammonia in exhaust gas from the internal combustion engine and an ammonia detection signal corresponding to the detection result;
a state determination section that determines whether or not the internal combustion engine is in a specific state in which the exhaust gas contains a specific gas that differs from ammonia and reacts with the ammonia sensor; and
a use suspension section that, when the state determination section determines that the internal combustion engine is in the specific state, suspends at least temporarily use of the at least one of the detection result and the ammonia detection signal that are received after the determination by the state determination section, wherein the specific state is a rich spike control state in which fuel is temporarily injected into an exhaust pipe of the internal combustion engine, a rich spike signal is a signal that indicates the rich spike control state, the state determination section determines whether or not the internal combustion engine is in the specific state based on processing of the rich spike signal sent from the internal combustion engine controller, and a change in a concentration of oxygen in the exhaust gas is not used for determining whether or not the sensor controller has received the rich spike signal.

9. The internal combustion engine controller according to claim 8, wherein the use suspension section initiates the suspension of the use of the at least one of the detection result and the ammonia detection signal at a suspension initiation time later than a time at which the state determination section determines that the internal combustion engine is in the specific state.

10. The internal combustion engine controller according to claim 9, wherein the use suspension section terminates the suspension of the use of the at least one of the detection result and the ammonia detection signal after lapse of a prescribed use suspension period from the initiation of the suspension of the use of the at least one of the detection result and the ammonia detection signal.

11. The internal combustion engine controller according to claim 8, wherein
the ammonia sensor is provided as a first detection section and configured to output the detection result, which is a first concentration signal that varies according to both the concentration of the ammonia contained in the exhaust gas and the concentration of a flammable gas contained in the exhaust gas,
the internal combustion engine controller further comprises;

a second detection section that outputs a second concentration signal that varies according to one of the concentration of the ammonia contained in the exhaust gas and the concentration of the flammable gas contained in the exhaust gas, and a flammable gas determination section configured to determine, on the basis of the first concentration signal output from the first detection section and the second concentration signal output from the second detection section, whether or not the exhaust gas contains the flammable gas, and when the state determination section determines that the internal combustion engine is in the specific state and the flammable gas determination section determines that the exhaust gas contains the flammable gas, the use suspension section suspends at least temporarily use of the at least one of the detection result and the ammonia detection signal that are detected after the determination by the state determination section and the determination by the flammable gas determination section.

* * * * *